United States Patent [19]

Eguchi

[11] Patent Number: 5,465,169

[45] Date of Patent: Nov. 7, 1995

[54] FERROELECTRIC LIQUID CRYSTAL DEVICE WITH ELECTROCONDUCTIVE PROTECTIVE FILM AND ELECTROCONDUCTIVE ALIGNMENT FILM

[75] Inventor: Ken Eguchi, Yokohama, Japan

[73] Assignee: Canon Kabushiki Kaisha, Tokyo, Japan

[21] Appl. No.: 111,477

[22] Filed: Aug. 25, 1993

[30]  Foreign Application Priority Data

Aug. 25, 1992 [JP] Japan .................................... 4-247198
Oct. 9, 1992 [JP] Japan .................................... 4-296580

[51] Int. Cl.⁶ ........................... G02F 1/1337; G02F 1/141
[52] U.S. Cl. .............................. 359/74; 359/76; 359/78; 359/100; 359/75; 428/1
[58] Field of Search .................................. 359/75, 74, 76, 359/78, 79, 100; 428/1

[56]  References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 5,118,538 | 6/1992 | Escher et al. | 359/75 |
| 5,130,830 | 7/1992 | Fukushima et al. | 359/75 |
| 5,165,076 | 11/1992 | Tsuboyama et al. | 359/74 |
| 5,231,523 | 7/1993 | Nakaya et al. | 359/56 |
| 5,231,528 | 7/1993 | Escher et al. | 359/100 |
| 5,239,398 | 8/1993 | Yanagisawa et al. | 359/76 |
| 5,270,846 | 12/1993 | Watanabe et al. | 359/74 |
| 5,321,538 | 6/1994 | Maruyama et al. | 359/79 |
| 5,327,272 | 7/1994 | Fujiwara et al. | 359/75 |

FOREIGN PATENT DOCUMENTS 0193427  11/1984  Japan .

*Primary Examiner*—William L. Sikes
*Assistant Examiner*—Tai V. Duong
*Attorney, Agent, or Firm*—Fitzpatrick, Cella, Harper & Scinto

[57]  ABSTRACT

A liquid crystal device is constituted by disposing a liquid crystal between a pair of substrates each having an electrode thereon and coated with an alignment film. The problem of hysteresis or reverse electric field effect of the liquid crystal device is alleviated by composing the alignment film with an alignment material, such as a polyimide, and a polymeric electroconductive compound, such as polyaniline. An electroconductive protective layer may be disposed between the electrode and the alignment film. The alignment film may be provided with an electroconductivity selectively at parts thereof above the electrode so as to provide an improvement in prevention of crosstalk between pixels.

16 Claims, 7 Drawing Sheets

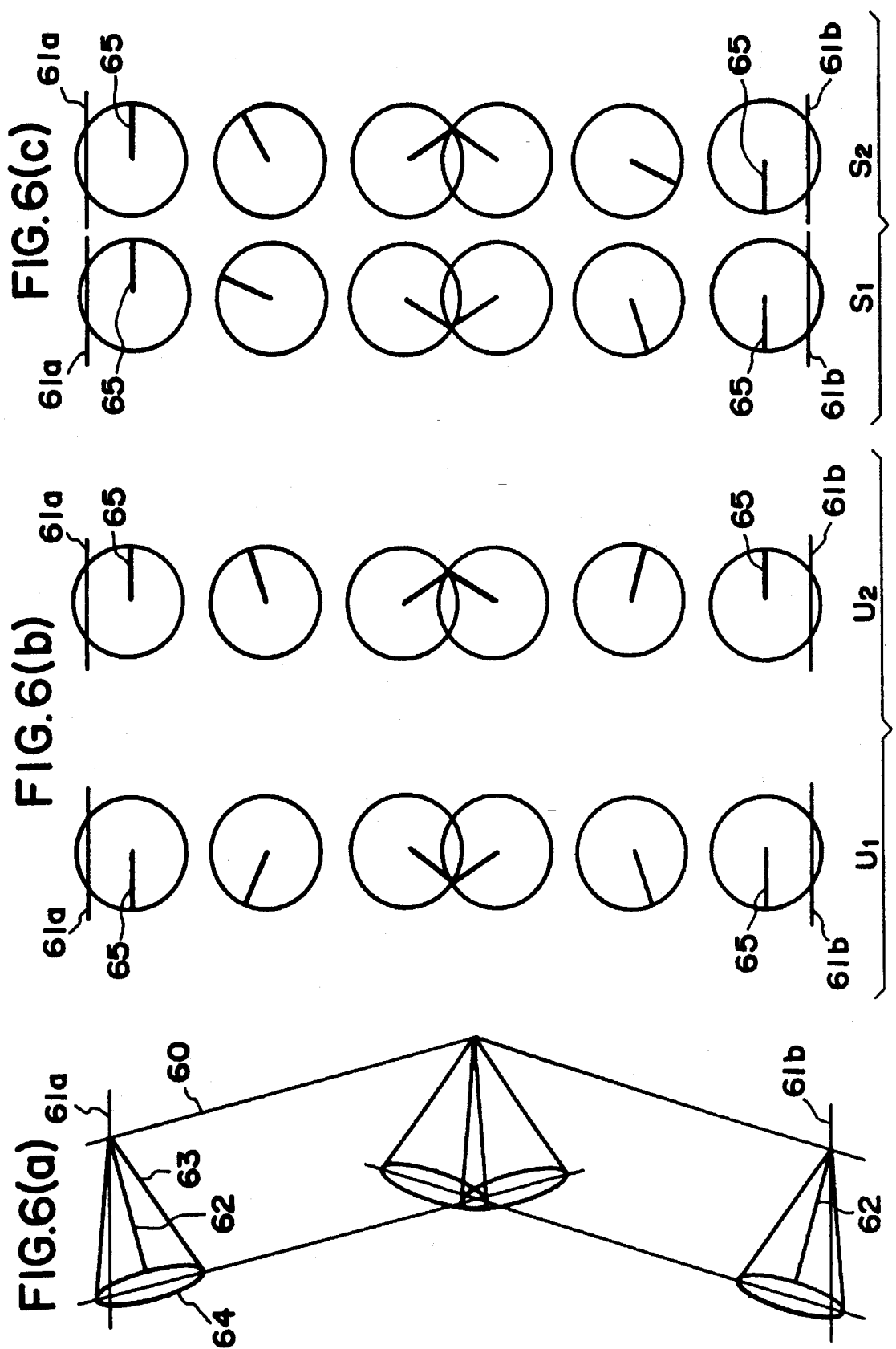

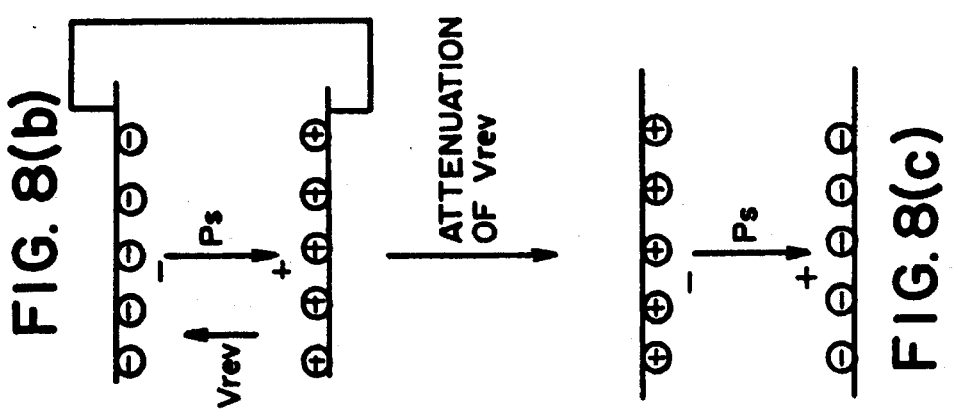
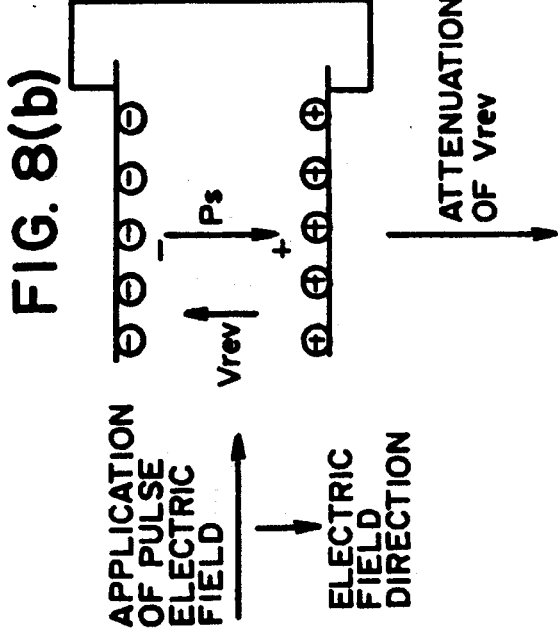
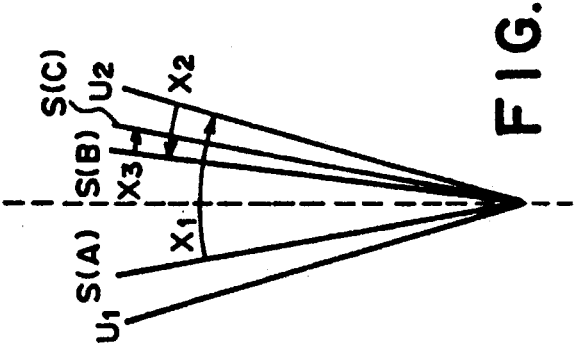
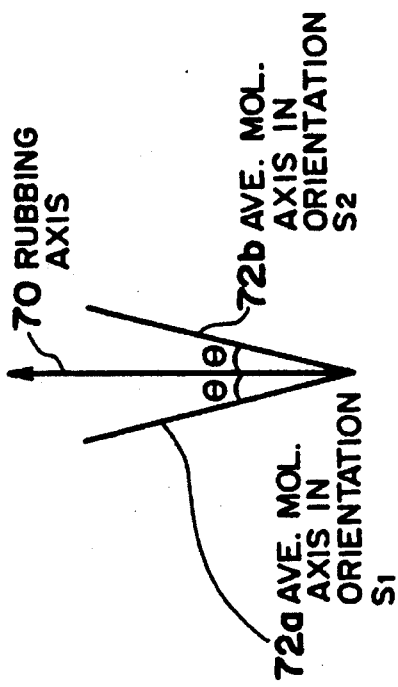
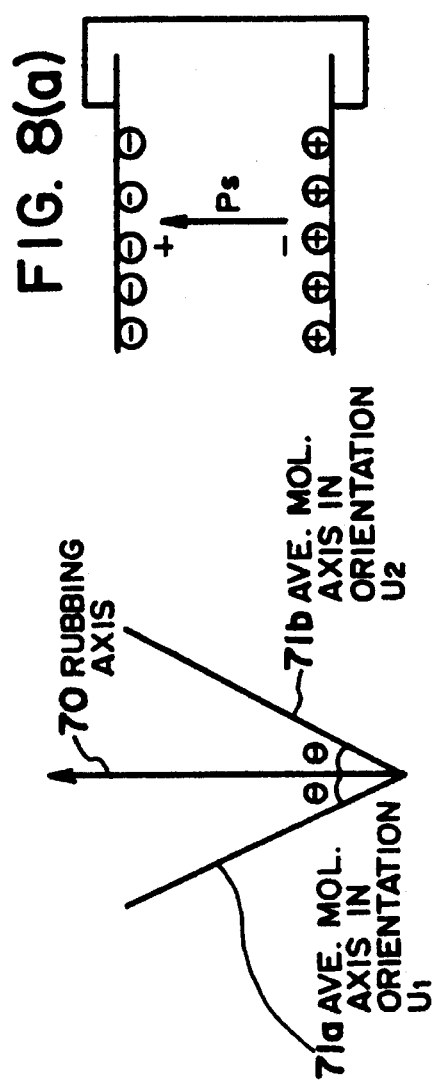

FERROELECTRIC LIQUID CRYSTAL DEVICE WITH ELECTROCONDUCTIVE PROTECTIVE FILM AND ELECTROCONDUCTIVE ALIGNMENT FILM

FIELD OF THE INVENTION AND RELATED ART

This invention relates to a liquid crystal device to be used in a liquid crystal display device or a liquid crystal-optical shutter, etc., particularly a liquid crystal device using a ferroelectric liquid crystal, more particularly to a liquid crystal device improved in display characteristics through improvement in initial alignment of the liquid crystal molecules.

TV images are motion pictures highly defined and having halftones. Display of such TV images requires the highest level of display technologies satisfying high resolution, high-speed responsiveness, multi-level gradation display, high contrast, high-reliability and color image formation. In these respects, TV images displayed on a CRT are very excellent in quality. However, along with a trend of desiring larger display areas, liquid crystal display apparatus capable of retaining a light weight have called attention, and extensive research has been made recently on TV image display methods using an active matrix-type liquid crystal display device wherein nematic liquid crystal is directly driven by a switching element disposed at each pixel. As the switching element, a TFT (thin film transistor) has been considered most suitable, but it provides a great difficulty in application to a larger area device because of complicated production process and a large number of steps involved therein.

On the other hand, a display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid crystal has generally chiral smectic C phase (SmC*) or H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display according to a simple matrix drive scheme in view of its function.

A ferroelectric liquid crystal device is driven according to an essentially binary display scheme based on control between bistable two states of the liquid crystal and accordingly has been considered unsuitable for halftone display. However, along with development of gradation display technique for ferroelectric liquid crystal, it is expected to apply the liquid crystal to a wider scope of application utilizing the excellent properties thereof. As a gradation display method according to a simple matrix drive scheme, there has been proposed an area gradation method wherein transition between two bistable alignment states is controlled microscopically within a pixel to form minute domains within the pixel (Japanese Laid-Open Patent Application (JP-A) 59-193427). However, according to the alignment control technique proposed heretofore, it has been difficult to stably and sufficiently control the above-mentioned minute domains, so that it has been difficult to realize practically feasible gradation display. It has been also difficult to provide a sufficiently increased contrast between the bistable two states and sufficiently remove the after-image or hysteresis phenomenon in the course of switching.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2(\Delta n d/\lambda)\pi,$$

wherein $I_0$: incident light intensity, $I$: transmitted light intensity, $\theta$: tilt angle, $\Delta n$: refractive index anisotropy, $d$: thickness of the liquid crystal layer, $\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle $\theta$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and according a polyimide film subjected to rubbing has been widely used. As an alignment method for a ferroelectric liquid crystal, particularly a chiral smectic liquid crystal in a non-helical structure, one disclosed in U.S. Pat. No. 4,561,726 has been known for example.

However, angle $\theta$ (an angle shown in FIG. 4 as described below) in a ferroelectric liquid crystal with a non-helical structure obtained by alignment with a rubbed polyimide film is generally smaller as compared with a tilt angle Ⓗ (the angle Ⓗ is a half of the apex angle of the cone shown in FIG. 3 as described below) in the ferroelectric liquid crystal having a helical structure. Particularly, the tilt angle $\theta$ in a ferroelectric liquid crystal with a non-helical structure obtained by alignment with a rubbed polyimide film was generally on the order of 3–8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle Ⓗ in a helical structure. It has been also clarified that such a smaller angle $\theta$ in a non-helical structure is attributable to a twist alignment of liquid crystal molecules. More specifically, in a ferroelectric liquid crystal of a non-helical structure, molecular axes 52 and 53 adjacent to upper and lower substrates provided with a uniaxial alignment axis 51 given by rubbing or oblique vapor deposition are twisted continuously with respect to a normal to the substrates in a twist direction 54 as shown in FIG. 5. This causes the tilt angle θ in the non-helical structure to be smaller than the tilt angle (H) in the helical structure.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display (as reported in "Switching characteristic of SSFLC" by Akio Yoshida, "Preprint for Liquid Crystal Forum, October 1987" p.p. 142–143). Further, there is also caused a problem of hysteresis in switching due to charge accumulation with ion species, etc.

In order to remove the after-image and hysteresis in the switch stage, it is desired to use an alignment having a high conductivity which however is liable to result in occurrence of crosstalk between pixels.

SUMMARY OF THE INVENTION

In view of the above-mentioned problems of the prior art, a principal object of the present invention is to provide a liquid crystal device wherein a hysteresis during switching is prevented while not being accompanied with occurrence of crosstalk between pixels.

Another object of the present invention is to provide a liquid crystal device with an improved contrast ratio between stable two states of a ferroelectric liquid crystal, i.e., optically dark and bright states and having solved the problem of after-image during the switching.

According to the present invention, there is provided a liquid crystal device, comprising a pair of substrates each having an electrode thereon and a liquid crystal disposed between the substrates, wherein at least one of the substrates is provided with an electroconductive protective film and also an alignment film comprising an alignment material and a polymeric electroconductive compound.

According to another aspect of the present invention, there is provided a liquid crystal device, comprising: a pair of substrates each having an electrode thereon and a liquid crystal disposed between the substrates, wherein at least one of the substrates is provided with an alignment film comprising an alignment material and a polymeric electroconductive compound.

According to another aspect of the present invention, there is provided a liquid crystal device, comprising: a pair of substrates each having an electrode locally disposed at a part thereon and a liquid crystal disposed between the substrates; wherein at least one of the substrates is provided with an alignment film comprising an alignment material and a polymeric electroconductive compound selectively on the part thereof having the electrode.

According to a further aspect of the present invention, there is provided a liquid crystal device, comprising: a pair of substrates each having an electrode locally disposed at a part thereon and a liquid crystal disposed between the substrates; wherein at least one of the substrates is provided with an alignment film having a locally enhanced electroconductivity selectively at the part thereof on the electrode.

In a preferred embodiment of the present invention, the above-mentioned polymeric electroconductive compound is at least one member selected from the group consisting of polypropylle, polyaniline and derivatives thereof represented by the following formula (1) and (2), and polythiophene and derivatives thereof:

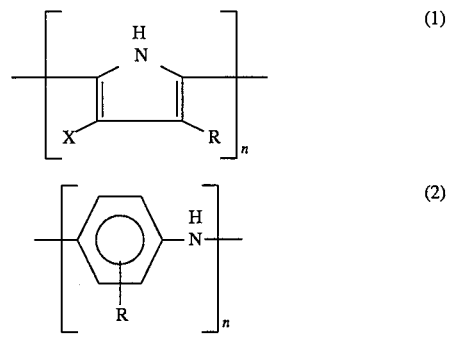

wherein X=—CO R, R=$C_mH_{2m+1}$, and m is an integer of 0–12.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 6(a) is a schematic sectional view showing an alignment state of a chiral smectic liquid crystal aligned according to the present invention; FIG. 6(b) is an illustration of C-director alignments in a uniform alignment state; and FIG. 6(c) is an illustration of C-director alignments in a splay alignment state.

FIGS. 7A and 7B are plan views illustrating tilt angles θ in a uniform alignment state and a splay alignment state, respectively.

FIGS. 8(a)–8(c) are sectional views showing a charge distribution, a direction of a spontaneous polarization $P_S$ and a direction of a reverse electric field Vrev.

FIG. 9 is a schematic plan view illustrating changes in tilt angle θ during and after application of an electric field.

DETAILED DESCRIPTION OF THE INVENTION

Figure 1:
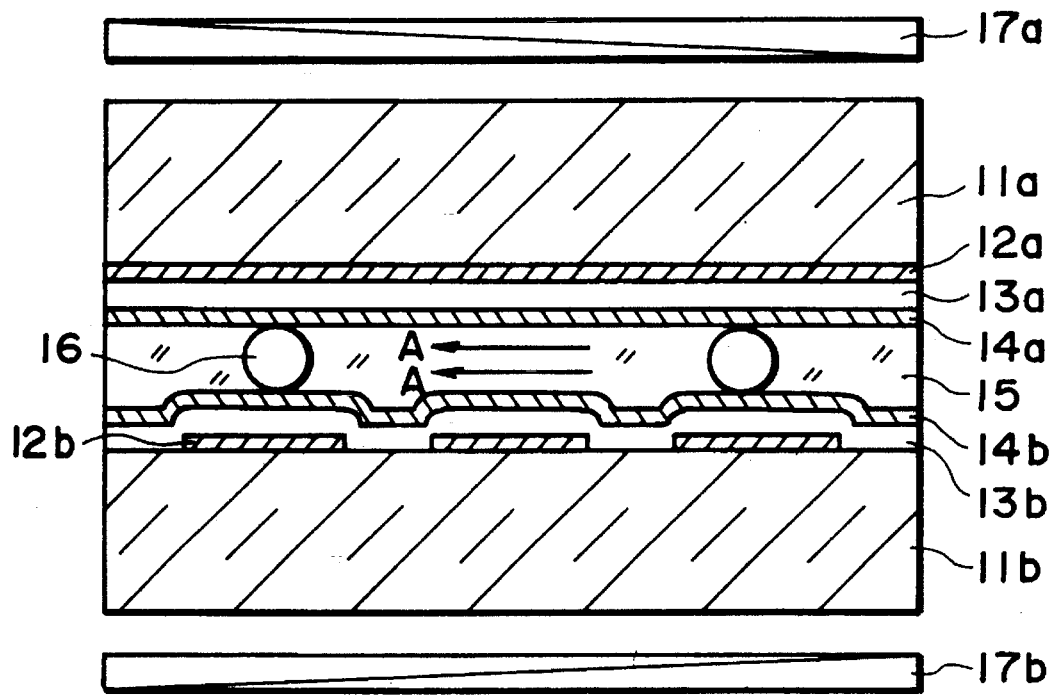
FIGS. 1 and 2 are respectively a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., 200–1000 Å-thick protective films 13a and 13b which are in charge of preventing short circuit between the opposite electrodes and also imparted with a slight electroconductivity for reducing static-electrical charges, and further with alignment films 14a and 14b.

The protective films 13a and 13b may preferably have an electroconductivity of at least $10^{-10}$ S/cm, more preferably $10^{-8}$–$10^{-4}$ S/cm, and comprise a material transparent to light in the visible region. The electroconductivity (S/cm) of a (protective) film may be measured as a reciprocal of the sheet resistivity ($\Omega \cdot cm$) of the film. More specifically, for the measurement, a film of a similar thickness ($\Delta d$) and the same material as the object film is formed on a glass substrate and a pair of a circular electrode (radius: r) and a ring electrode with an annular spacing (annular area: $S_0$) from the circular electrode are disposed on the film, whereby a resistance value $R_0$ is measured for the annular spacing. The sheet resistivity R ($\Omega \cdot cm$) is calculated as $R=R_0 \times S_0 / (2\pi r \times \Delta d)$ from which the electroconductivity is calculated as the reciprocal.

Examples of materials constituting the protective films may include various metal oxides and sulfides, such as $WO_3$, $TiO_2$, ZnO, ZnS, CdO and CdS. These oxides and sulfides are also advantageous in that their electroconductivity can be widely controlled by addition of a slight dopant. A mixture of these materials may also be effectively used for providing an amorphous protective film of a higher smoothness. The protective films may be formed by any methods including, e.g., electron beam sputtering and evaporation.

A ferroelectric or chiral smectic liquid crystal 15 is disposed between the alignment films 14a and 14b and the spacing therebetween is set to provide the liquid crystal layer 15 with a thickness (e.g., 0.1–3 microns) which is sufficiently small to suppress the formation of a helical structure of the chiral smectic liquid crystal 15 by disposing spacer beads 16 of, e.g., silica, alumina, etc. between the alignment films 14a and 14b, whereby the chiral smectic liquid crystal 15 assumes a bistable alignment state. The thus formed cell structure is sandwiched between a pair of polarizers 17a and 17b arranged in cross nicols.

The alignment film according to the present invention comprises an alignment material for controlling the alignment state of liquid crystal molecules and a polymeric electroconductive compound for imparting an electroconductivity to the alignment film. The polymeric electroconductive compound may preferably be a basic polymer, examples of which may suitably include polypyrrole, polyaniline and derivatives thereof represented by the following formula (1) and (2), and polythiophene and derivatives thereof:

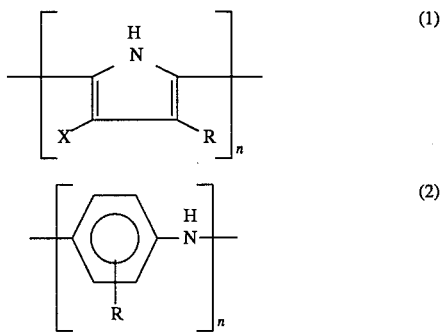

wherein $X=-CO\ R$, $R=C_mH_{2m+1}$, and m is an integer of 0–12.

Further, it is also possible to use a derivative, such as poly(pyridine-2,5-diyl), poly(2,2'-bipyridine-5,'-diyl), or poly(pyridine-5,2-diyl-thiophene- 2,5-diyl).

It is generally preferred to add a dopant in order to increase the electroconductivity of the polymeric electroconductive compound and increase the carrier density. The dopant may preferably be an ionic low-molecular weight compound, suitable examples thereof may include: halogen ions, and oxide anions, such as perchlorate ions, sulfate ions and nitrate ions. It is also possible to use metal ions, such as alkaline metal ions.

As ion migration under an electric field is generally slow, however, it is possible that the slowness influences the hysteresis in a high-speed switching process of a ferroelectric liquid crystal, and the stability and controllability of the resultant minute domains. Accordingly, in the present invention, it is preferred that the alignment material constituting the alignment film comprises a compound having an acidic functional group so as to form a polymer complex having an improved electroconductivity between the alignment material and the polymeric electroconductive compound. Suitable examples of such an alignment material may include polyimides, polyamideimides and precursors thereof.

The alignment film may be formed in a conventional manner by using the above-mentioned materials. The alignment film may preferably be formed in a small thickness in order to effectively suppress the occurrence of a reverse electric field due to charge accumulation, e.g., by the LB (Langmuir-Blodget) method, coating or vapor deposition. For example, the alignment film may preferably be formed in a thickness of 4–200 Å, more preferably 16–100 Å, further preferably 16–50 Å, when prepared by the LB method. The direction of withdrawing a substrate for forming an alignment film thereon may be appropriately selected since there is no remarkable difference observed between a case where two substrates are affixed to each other so that their withdrawal directions are in identical directions (e.g., as identified by A in FIG. 1) and a case where their withdrawal directions are in mutually opposite directions.

In the case of forming an alignment film by coating or vapor deposition, the alignment film may be formed in a thickness of 30–500 Å, preferably 30–200 Å, more preferably 30–100 Å.

In order to provide the alignment film with a better alignment effect, it is preferred to further rub the surface of the alignment film. The rubbing may be applied to only one of the substrates or both substrates each having an alignment film so that the rubbing directions are parallel, anti-parallel or cross each other with a small angle of, e.g., 1–15 degrees, depending on the alignment characteristic of a liquid crystal material used. The rubbing per se may be performed in a conventional manner.

Figure 2:
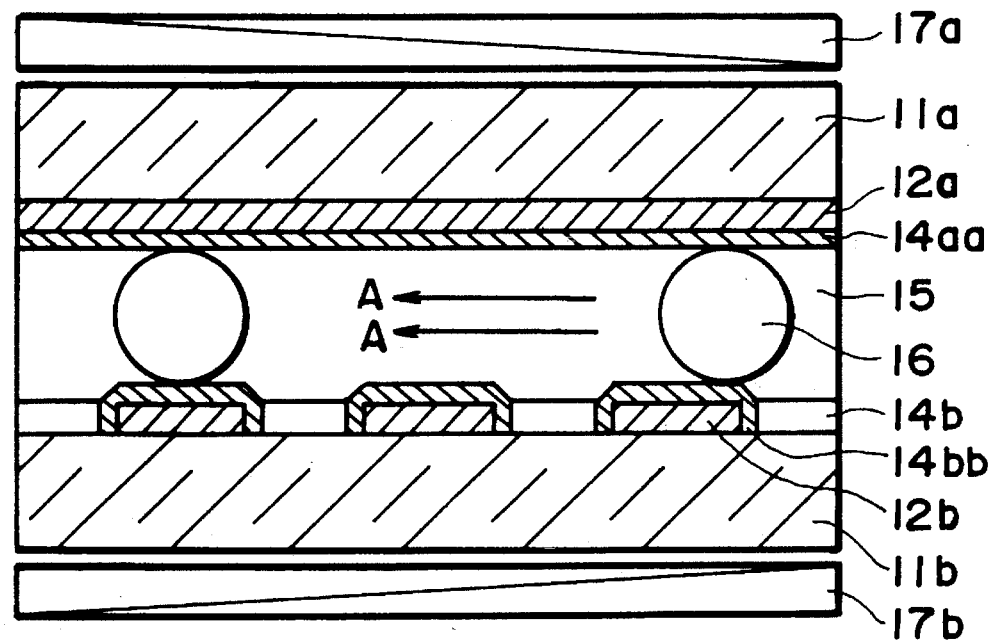

FIG. 2 is a schematic sectional view similar to FIG. 1 of another embodiment of the liquid crystal device according to the present invention. In this embodiment, parts 14aa and 14bb of the alignment films 14 and 14b corresponding to pixels, i.e., parts on the electrodes of the alignment films, are selectively imparted with an enhanced electroconductivity.

The parts 14aa and 14bb of the alignment films may be imparted with an enhanced electroconductivity by adding to an alignment material a preferably basic electroconductive polymer, examples of which may suitably include polypropylle, polyaniline and derivatives thereof represented by the following formula (1) and (2), and polythiophene and derivatives thereof:

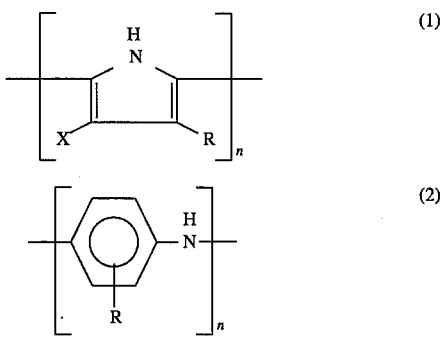

wherein X=—CO R, R=$C_mH_{2m+1}$, and m is an integer of 0–12.

Further, it is also possible to use a derivative, such as poly(pyridine-2,5-diyl), poly(2,2'-bipyridine-5,5-diyl), or poly(pyridine-5,2-diyl-thiophene- 2,5-diyl)).

In order to obviate the problem of crosstalk between pixels in a liquid crystal cell of a simple matrix structure, it is necessary to maintain a resistivity of at least $10^5$ ohm.cm between pixels of the alignment film. For this reason, in this embodiment shown in FIG. 2, the parts 14aa and 14bb on the electrodes of the alignment films 14a and 14b are locally selectively imparted with a electroconductivity of at least $10^{-4}$ S/cm so as to prevent the occurrence of the crosstalk.

The locally enhanced electroconductivity may for example be effected by doping With ionic dopants as described above during electrolytic oxidation. The electrolytic oxidation is locally Selectively caused at the parts 14aa and 14bb on the electrodes so that the parts can be locally selectively imparted with an enhanced electroconductivity. The electrolytic oxidation may be performed by applying a voltage to the film within an electrolyte organic solution containing a desired ion. However, the method of local doping is not restricted to the electrolytic oxidation as far as the object of the invention can be accomplished.

The liquid crystal material 15 used in the present invention is not particularly limited but may preferably be one showing a phase transition from isotropic phase through cholesteric phase and smectic A phase into chiral smectic C phase in the course of temperature decrease in view of easiness in initial homogeneous alignment after liquid crystal injection. Particularly, a chiral smectic liquid crystal showing a helical pitch of 0.8 micron or longer in cholesteric phase (measured at a mid temperature in the cholesteric range) is preferred. Preferred examples of such a liquid crystal material may include liquid crystal materials (1)–(5) below comprising the following liquid crystals [A], [B] and [C] in the indicated proportions by weight.

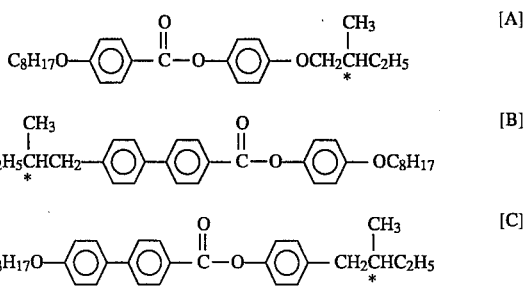

Liquid crystal material (1) [A]$_{90}$/[B]$_{10}$
(2) [A]$_{80}$/[B]$_{20}$
(3) [A]$_{70}$/[B]$_{30}$
(4) [A]$_{60}$/[B]$_{40}$
(5) [C]

In addition to the above, it is also preferred to use a ferroelectric liquid crystal having a sufficiently large spontaneous polarization of, e.g., at least 10 nC/cm$^2$, so that a spatial dispersion of the spontaneous polarization of a ferroelectric liquid crystal molecule, i.e., a polarization field created by the spatial charge, can affect the molecular orientation of the ferroelectric liquid crystal, particularly in view of stability and reproducibility in the switching process, in combination with the alignment film having the above-mentioned characteristic or the electroconductive alignment film including the electroconductive protective film. Further, it is sufficiently possible to use a ferroelectric liquid crystal not having a cholesteric phase in the course of temperature decrease or having a helical pitch of below 0.5 μm in SmC* phase while accomplishment of initial homogeneous alignment after the liquid crystal injection becomes somewhat difficult.

In the liquid crystal device having the above-described structure, while the mechanism has not been clarified as yet, it is possible to stably control the transmittance due to the occurrence of the above-mentioned minute domains, by controlling the mixing ratio between the electroconductive compound and the alignment material, and further to provide a pixel with a voltage/transmittance characteristic gradually changing over a wide transmittance region due to wide distribution of minute regions having different threshold voltages over the pixel, thus allowing halftone control.

Figure 3:
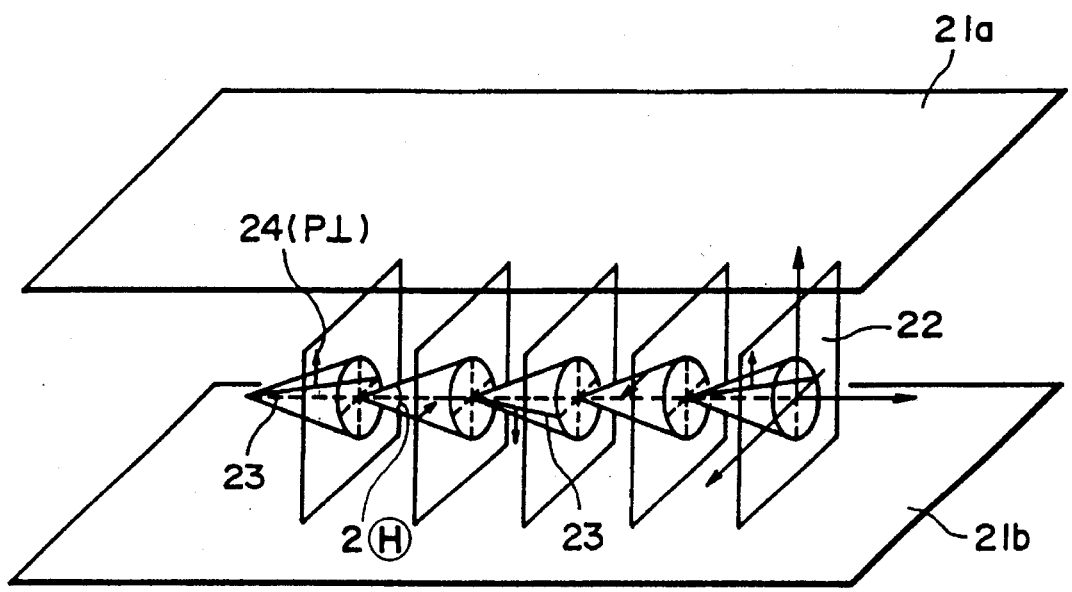
FIG. 3 is a perspective view showing schematically an alignment of a chiral smectic liquid crystal having a helical structure.

FIG. 3 is a schematic illustration of a ferroelectric liquid crystal cell (device) for explaining operation thereof. Reference numerals 21a and 21b denote substrates (glass plates) on which a transparent electrode of, e.g., In$_2$O$_3$, SnO$_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. A half of the apex angle of a helical cone in this state is a tilt angle Ⓗ in chiral smectic phase of such a helical structure.

When a voltage higher than a certain threshold level is applied between electrodes formed on the substrates 21a and 21b, a helical structure of the liquid crystal molecule 23 is unwound or released to change the alignment direction Of respective liquid crystal molecules 23 so that the dipole moment (P⊥) 24 are all directed in the direction Of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 4:
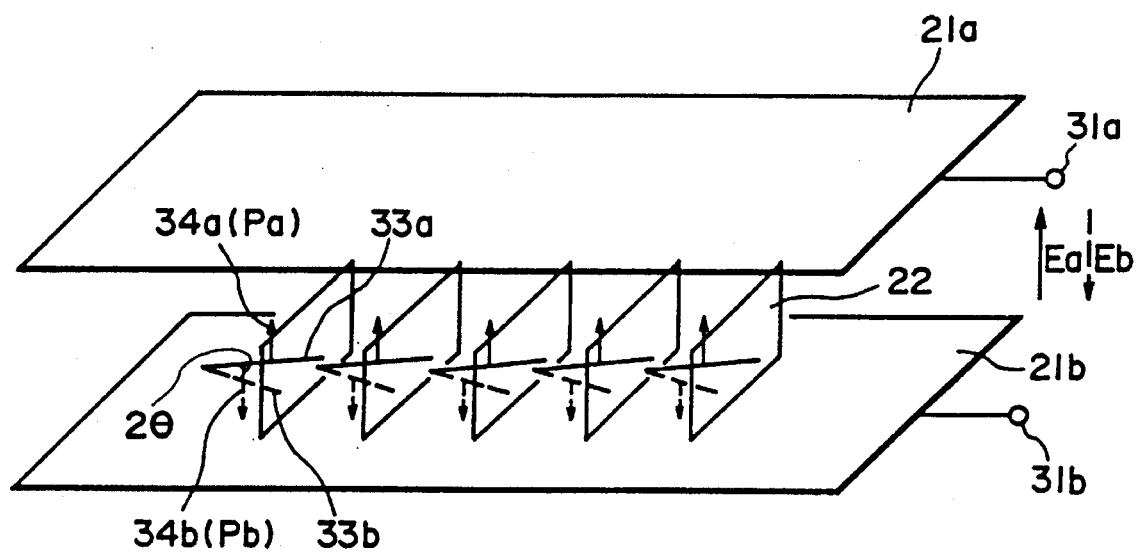
FIG. 4 is a perspective view showing schematically an alignment state of a chiral smectic liquid crystal having a non-helical structure.
Figure 5:
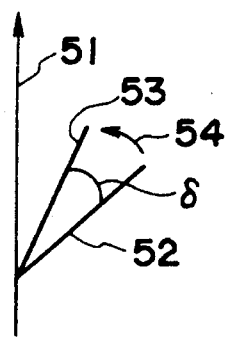
FIG. 5 illustrates a relationship between a uniaxial alignment axis provided to the substrates and liquid crystal molecular axes adjacent to the substrates of a ferroelectric liquid crystal.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 4, thus providing a bistable condition. When an electric field Ea or Eb higher than a certain threshold level and different from each other in polarity as shown in FIG. 4 is applied to a cell having the above-mentioned characteristics by voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 4. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 6(a) is a schematic sectional view showing an alignment state of liquid crystal molecules attained by the present invention, and FIG. 6(b) is a view showing alignment of corresponding C-directors. Reference numerals 61a and 61b in FIG. 6(a) denote upper and lower substrates, respectively. Numeral 60 denotes a molecular layer composed of liquid crystal molecules 62, and liquid crystal molecules 62 are aligned so as to change their positions along the bottom face 64 (circular) of a cone 64. FIG. 6(b) more specifically shows a change in C-directors. Referring to FIG. 6(b), at $U_1$ are shown C-directors 65 (each being a projection of a molecular long axis onto an imaginary plane perpendicular to the normal to a molecular layer 60) in one stable orientation state, and at $U_2$ are shown C-directors 65 in the other stable orientation state.

On the other hand, an alignment state attained by a conventional rubbing-treated polyimide film may be represented by a C-director diagram of FIG. 6(c), which shows an alignment state wherein molecular axes are twisted in a large degree from the upper substrate 61a to the lower substrate 61b to provide a smaller tilt angle θ.

FIG. 7A is a schematic plan view illustrating a tilt angle θ in an alignment state where C-directors 65 assume a state shown in FIG. 6(b) (referred to as "uniform alignment state"), and FIG. 7B is a schematic plan view illustrating a tilt angle θ in an alignment state where C-directors 65 assume a state shown in FIG. 6(c) (referred to as "splay alignment state"). In these figures, reference numeral 70 denotes a direction of withdrawing a substrate for forming an alignment film on the substrate by the LB Langmuir-Blodget) technique or a uniaxial alignment axis provided by rubbing onto an alignment film formed by coating or vapor deposition, numeral 71a denotes an average molecular axis in the orientation state $U_1$, numeral 71b denotes an average molecular axis in the orientation state $U_2$, numeral 72a denotes an average molecular axis in the orientation state $S_1$, and numeral 72b denotes an average molecular axis in the orientation state $S_2$. The average molecular axes 71a and 71b can be switched to each other by applying voltages of mutually opposite polarities. Similar switching is caused between the average molecular axes 72a and 72b.

Next, the effectiveness of the uniform alignment state with respect to a delay in optical response (after-image) due to a reverse electric field Vrev is explained. If the capacitance of an insulating layer constituting a liquid crystal cell is denoted by Ci, the capacitance of a liquid crystal layer is denoted by $C_{LC}$ and the spontaneous polarization of the liquid crystal is denoted by $P_S$, Vrev causing after-image is expressed by the following equation.

$$Vrev=2P_S/(Ci+C_{LC})$$

FIG. 8 is a schematic sectional view illustrating changes in charge distribution direction of $P_S$ and direction of the reverse electric field in a liquid crystal cell. At FIG. 8(a), there is shown a distribution of ⊕ and ⊖ charges in a memory state before application of a pulse electric field, where the spontaneous polarization is directed from ⊕ charges to ⊖ charges. At FIG. 8(b) is shown a state immediately after removal of a pulse electric field, when the direction of the spontaneous polarization $P_S$ is opposite to that shown at FIG. 8(a) (thus, the liquid crystal molecules are inverted from one stable orientation state to the other orientation state) but the distribution of the ⊕ and ⊖ charges is similar to that shown at FIG. 8(a), so that a reverse electric field Vrev is generated as indicated by an arrow shown at FIG. 8(b). The reverse electric field Vrev disappears in a short time to provide a distribution of ⊕ and ⊖ charges as shown at FIG. 8(c).

Figure 10:
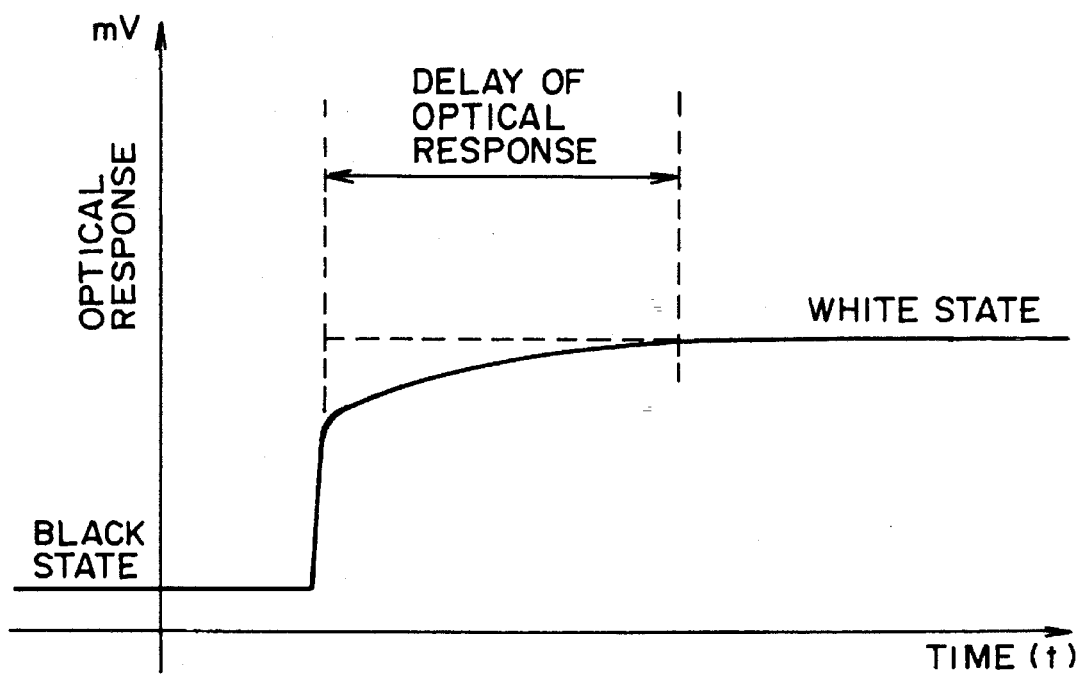
FIGS. 10 and 11 are graphs showing optical response characteristics according to a conventional device and the present invention, respectively.

FIG. 9 is a plan view showing a change in optical response in a splay alignment state given by a conventional polyimide alignment film in terms of a change in tilt angle θ. Referring to FIG. 9, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle (H) along a path denoted by an arrow $X_1$, and immediately after the removal of the pulse electric field, the orientation is changed along a path denoted by an arrow $X_2$ to an average molecular axis S(B) in a splay alignment state providing a decreased tilt angle θ due to the action of the reverse electric field Vrev shown at FIG. 8(b). Then, as the reverse electric field Vrev attenuates as shown at FIG. 8(c), the orientation is changed along a path denoted by an arrow $X_3$ to an average molecular axis S(C) in a splay alignment state providing a stable orientation state having a somewhat increased tilt angle θ. The resultant optical response in this case is shown in FIG. 10.

Figure 11:
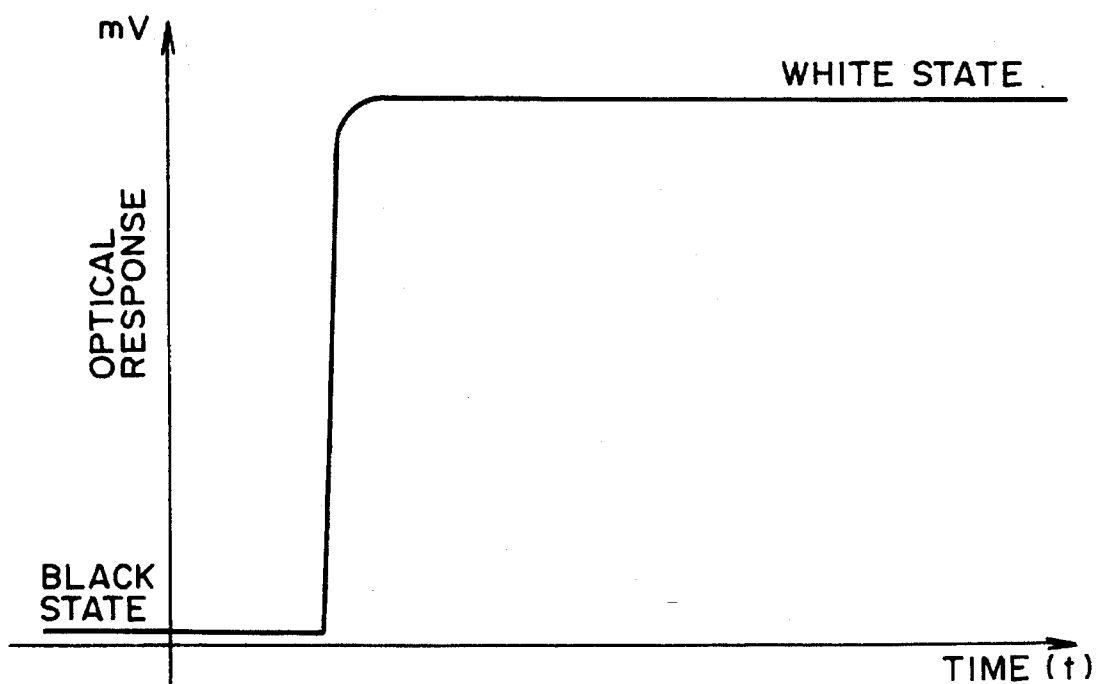

In the alignment state given by using the above-mentioned electroconductive alignment layer of the present invention, the average molecular axes S(A), S(B) and S(C) in the splay alignment state shown in FIG. 9 are not caused but it is possible to form an alignment state with an average molecular axis giving a tilt angle θ which is close to a maximum tilt angle Ⓗ. An optical response at this time according to the present invention is shown in FIG. 11. FIG. 11 shows that a delay in optical response causing after-image as observed in a conventional liquid crystal device as shown in FIG. 10 is obviated and a high contrast in memory states is caused.

As is more specifically described with reference to Examples shown below, by using an electroconductive alignment layer in the present invention, it is possible to realize an alignment state which provides a large optical contrast between the bright and dark states, particularly a large contrast for pixels in the non-selection state during a multiplexing drive as disclosed in U.S. Pat. No. 4,655,561, and obviates a delay in optical response at the time of switching (multiplexing drive) leading to after-image in display.

EXAMPLE 1

Two 1.1 mm-thick glass plates each provided with 1500 Å-thick ITO stripe electrodes were respectively coated with a 600 Å-thick $WO_3$ film by sputtering or a $WO_3$ target at a film-forming rate of 1 Å/sec under a reduced pressure of $1\times10^{-6}$ Torr. The resultant $WO_3$ protective film showed a sheet resistivity of $0.1\times10^{-8}$ S/cm. Then, the protective film was further coated with a polyimide alignment film imparted with an electroconductivity by the LB method in the following manner.

A polyamide acid of formula (3) below was dissolved in NMP (N-methylpyrrolidone) at a monomer-basis concentration of $1\times10^{-3}$ M and mixed with a separately prepared $1\times10^{-3}$ M solution of N,N'-dimethyloctadecylamine in NMP in a volume ratio of ½ to form a solution of polyamide acid octadecylamine salt of formula (4) below:

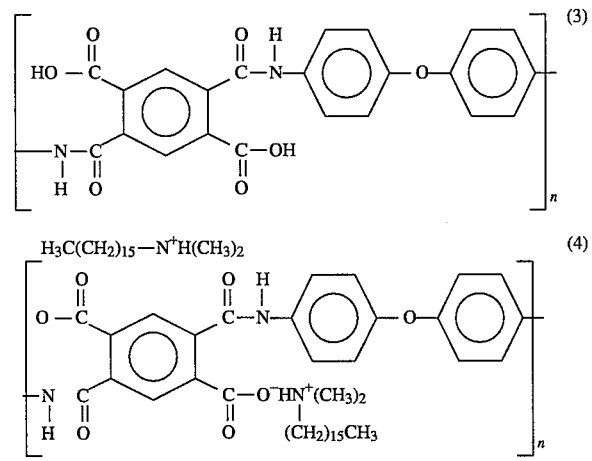

Into the solution, polyaniline dissolved in NMP in weight ratios of ⅟₁, ½, ⅕, ⅟₁₀ and ⅟₁₀₀ with respect the polyamide acid in the solution was added to form 5 solutions. Each solution was extended on pure water at 20° C. to form a mono-molecule layer on the water. After removing the solvent by evaporation, the surface pressure was increased up to 25 mN/m. While maintaining the surface pressure at constant, the above-prepared electrode plate (coated with a $WO_3$ protective film) was gently dipped into the bath at a rate of 5 mm/min. in a direction across the water surface and then gently withdrawn (drawn up) at a rate of 5 mm/min to form a Y-type two mono-molecule layer built-up film. By repeating the dipping and withdrawal, a twenty mono-molecule layer built-up film of a polyamide acid octadecylamine salt/polyaniline mixture. Then, the thus-coated substrated was heat-treated at 100° C. for 1 hour, baked at 200° C. for 30 min. to convert the polyamide acid into a corresponding polyimide of formula (5):

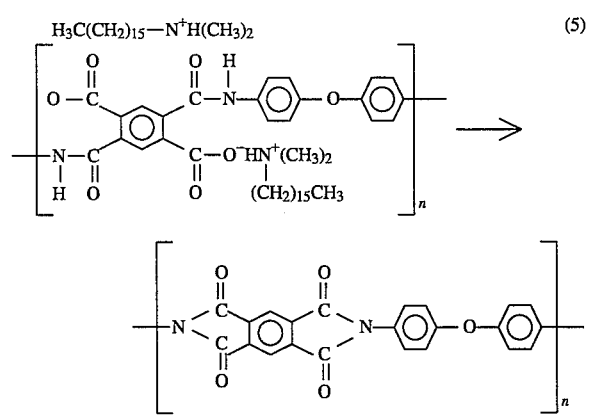

The thus formed polyimide film on the substrate was then subjected to a rubbing treatment under the conditions of a rubbing roller pile yarn pressing depth of 0.4 mm, a rubbing roller rotation speed of 1000 rpm and a substrate feed rate of 12 mm/sec. At this time, the substrate was rubbed in substantially the same direction as the withdrawal direction during the LB film formation.

On one of the two glass plates thus treated, 1.5 μm-dia. alumina beads were dispersed, and the other glass plate was superposed thereon so that their rubbing axes were parallel to each other and disposed in the same direction to form a blank cell (panel) having a diagonal size of 15 inches.

The blank cell was filled with a biphenyl ester-based ferroelectric liquid crystal ("CS-1014" (trade name), available from Chisso K.K. ) under vacuum and, after sealing, was gradually cooled from isotropic phase at a rate of 0.5° C./min. to 30° C., whereby an alignment was effected. The "CS-1014" liquid crystal in the cell showed the following phase transition series.

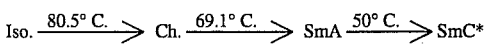

Iso.: isotropic phase,
Ch.: cholesteric phase,
SmA: smectic A phase,
SmC*: chiral smectic C phase.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby a tilt angle, a contrast (i.e., a ratio of transmittances between the bright state and the darkest state), and a delay time in optical response leading to after-image were measured. The above-measurement was repeated by using 5 cells having polyimide alignment films prepared through different polyamide acid/polyaniline mixing ratios. The results are shown in the following Table 1.

TABLE 1

| Mixing ratio | Tilt angle | Contrast | Delay time |
|---|---|---|---|
| 1:1 | 14 (deg.) | 49:1 | ≦0.1 sec |
| 2:1 | 14 | 49:1 | " |
| 5:1 | 15 | 51:1 | " |
| 10:1 | 15 | 51:1 | " |
| 100:1 | 15 | 51:1 | " |

Figure 12:
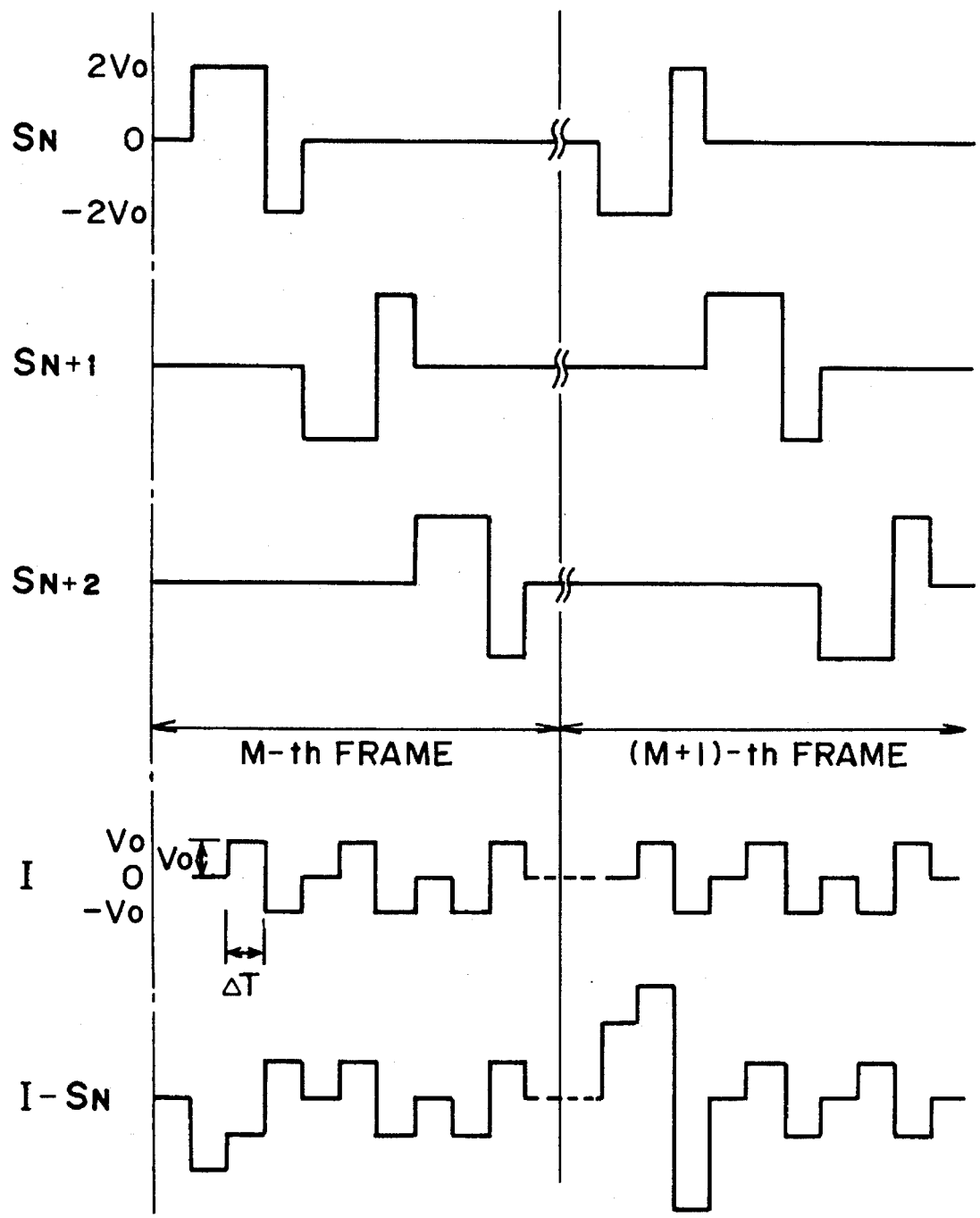
FIG. 12 is a waveform diagram illustrating driving waveforms used in an embodiment of the present invention.

Each liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no afterimage was recognized. Referring to FIG. 12, at $S_N$, $S_{N+1}$ and $S_{N+2}$ are shown voltage waveforms applied to scanning lines, at I is shown a voltage waveform applied to a representative dateline, and at $(I-S_N)$ is shown a combined voltage waveform applied to the data line I and the scanning line $S_N$. In the above embodiment, the drive was performed under the conditions of $V_0$=5–8 volts and $\Delta T$=20–70 μsec.

EXAMPLE 2

Liquid crystal cells were prepared in the same manner as in Example 1 except that the protective films were formed as 600 Å-thick ZnO films instead of the $WO_3$ films by argon sputtering of ZnO target in a total pressure of 10 mTorr with $O_2$ partial pressure of 50% at a film forming rate of 2.0 Å/sec and the alignment films were formed as an 8-layer LB built-up films of the same polyimide. As a result of evaluation, the cells showed similarly good results as in Example 1. Further, as a result of multiplexing drive in the same manner as in Example 1, similarly good results as in Example 1 were obtained with respect to contrast and after-image.

EXAMPLE 3

Five liquid crystal cells were prepared in the same manner as in Example 1 except that alignment films were formed in a thickness of 200 Å by spin coating of mixture solutions of a polyimide precursor ("LQ1802" mfd. by Hitachi Kasei) and the polyaniline.

The liquid crystal cells having polyimide alignment films prepared through different polyimide precursor/polyaniline mixing ratios showed similarly good results as in Example 1 as shown in the following Table 2.

TABLE 2

| Mixing ratio | Tilt angle | Contrast | Delay time |
|---|---|---|---|
| 1:1 | 15 (deg.) | 53:1 | ≦0.1 sec |
| 2:1 | 15 | 53:1 | " |
| 5:1 | 15 | 55:1 | " |
| 10:1 | 15 | 55:1 | " |
| 100:1 | 15 | 55:1 | " |

Further, as a result of multiplexing drive in the same manner as in Example 1, similarly good results as in Example 1 were obtained with respect to contrast and after-image.

Further, liquid crystal cells were prepared in the same manner as in Example i except that the alignment films were formed as twenty LB monomolecule layer built-up films by using the polyimide precursor ("LQ1802") instead of the polyamide acid. The liquid crystal cells showed similarly good results as above.

EXAMPLE 4

Liquid crystal cells were prepared in the same manner as in Example 3 except that the following polypyrrole derivative was used instead of the polyaniline used in Example 3.

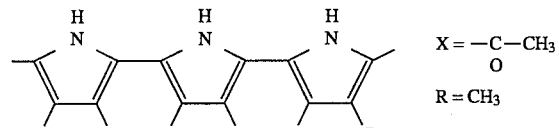

The liquid crystal cells showed similarly good results as in Example 3.

Further, as a result of multiplexing drive in the same manner as in Example 3, similarly good results as in Example 3 were obtained with respect to contrast and after-image.

EXAMPLE 5

A biphenyl ester-based ferroelectric liquid crystal showing the following transition was used instead of the ferroelectric liquid crystal ("CS-14") used in the above Examples.

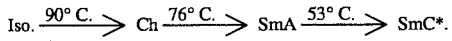

The liquid crystal showed a helical structure with a helical pitch of about 4 μm when formed in a large layer thickness (around 100 μm). The liquid crystal showed a spontaneous polarization of about 10 $nC/cm^2$ as measured by the triangular wave method and a tilt angle θ of 23.5° C. (at a cell thickness of 1.5 μm) which is close to the optimum value.

The liquid crystal was injected into a blank cell identical to the one prepared in Example 1 (with alignment films formed at a polyamide acid/polyaniline mixing ratio of ½) to form a liquid crystal cell. The liquid crystal cell showed an apparent tilt angle θ of 16 degrees which was smaller than the optimum value.

Then, the liquid crystal cell was supplied with an AC voltage of ±45–55 volts and a frequency of 40 Hz for 15 min., when a domain providing a tilt angle θ of 20.2 degrees began to appear. When the AC voltage was increased to the range of 55–70 volts, the domain of the increased tilt angle was enlarged to the entire cell, thus providing a very good contrast. On the contrary, at an AC voltage in excess of 70 volts, numerous defects occurred to collapse the monodomain structure. Switching between bistable states after appearance of the stable monodomain was effected according to the following voltage-pulse width characteristic.

TABLE 3

| Pulse width (msec) | 1.5 | 1.0 | 0.5 |
|---|---|---|---|
| Voltage (V) | 16.2 | 17.0 | 21.0 |

The change in alignment state after the AC voltage application was considered to be caused by the release of a twist of a liquid crystal molecular layer as shown in FIG. 6(a). Further, the inversion voltage was increased from that before the AC voltage application. The reason for this has not been clarified as yet but it might be considered that a higher inversion voltage is required in order to invert liquid crystal molecules inclusive of those in the vicinity of the alignment films. The quantity of transmitted light in the bright state was remarkably increased, thus providing a remarkably increased contrast ratio, due to the increase in tilt angle θ after the AC voltage application. Further, the delay in optical response to an inversion electric field was at most 0.1 sec, and stable switching was possible.

A ferroelectric liquid crystal phase showing bistability is generally developed by cooling from a higher temperature. In this embodiment, when the cooling was effected under application of an AC electric field of 50 Hz and 65 volts, a homogeneous monodomain alignment state was realized over a wide range.

EXAMPLE 6

Blank cells were prepared by using two pairs of electrode plates having alignment films of LQ1801 polyimide/polyaniline in mixing ratio of $10/1$ and $100/1$, respectively, prepared in the same manner as in Example 3 and by affixing each pair of electrode plates so that their rubbing directions were anti-parallel to each other. Two liquid crystal cells were prepared by filling the blank cells with the same ferroelectric liquid crystal as in Example 5 and supplied with an AC voltage of 40 Hz and 60 V for 15 min., whereby a homogenous monodomain alignment state providing a tilt angle θ of 21.6 degrees was developed. The liquid crystal cells were evaluated in the same manner as in Example 1 and found to provide a contrast ratio which was remarkably improved compared with those in Example 3.

Further, as a result of multiplexing drive in the same manner as in Example 1, similarly good results as in Example 1 were obtained with respect to contrast and after-image.

Figure 13:
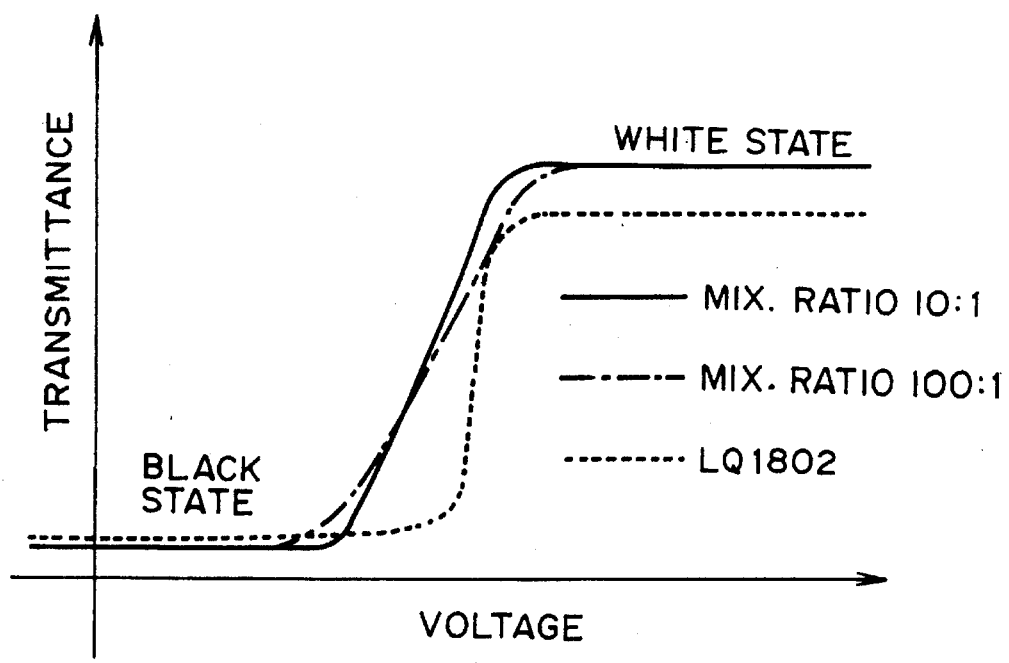
FIGS. 13 and 14 are respectively a graph showing transmittance-voltage characteristics of liquid crystal devices according to the invention and a comparative device.

Then, the liquid crystal cells were supplied with rectangular pulses with a pulse width of 50 μsec and varying amplitudes whereby voltage (V)—transmittance (T) characteristics as represented by a solid line and a dot-and-dash line in FIG. 13 were obtained. The V-T characteristics were more moderate than the V-T characteristic of a comparative liquid crystal cell with 8-layer LB films of LQ 1802 polyimide alone represented by a dot line in FIG. 13. The moderate V-T characteristics (causing a gradual change in transmittance in response to a voltage change) may be attributable to the distribution of minute regions having different threshold voltages over a pixel. Such moderate V-T characteristics attained by forming an alignment film with a mixture of an electroconductive polymeric compound and a polyimide alignment material were found to provide a halftone display characteristic. The two liquid crystal cells of this example were also found to provide a larger contrast compared with the comparative liquid crystal cell as shown in FIG. 13. The difference in V-T characteristic between the two liquid crystal cells having different mixing ratios was found but the mechanism thereof has not been clarified as yet.

The following examples beginning with Example 7 relate to a liquid crystal cell having an alignment film imparted with an electroconductivity selectively at parts covering the electrodes alone as shown in FIG. 2.

EXAMPLE 7

Two 1.1 mm-thick glass plates each provided with 1000 Å-thick ITO stripe electrodes were respectively coated with a mono-molecular layer accumulated LB film of a polyimide/polyaniline mixture prepared in the same manner as in Example 1 by using a polyamide acid/polyaniline mixing ratio of $10/1$.

In this way, five pairs of electrode plates with alignment films in thicknesses of 40 Å, 80 Å, 120 Å, 160 Å and 200 Å, respectively, were formed. Then, each substrate provided with an alignment film was subjected to electrolytic oxidation of the alignment film within a non-aqueous solution (electrolyte) of sodium octylsulfonate at 0.5M in acetonitrile while applying a voltage of 0.5 volt to the substrate. The electrolytic oxidation was stopped when the oxidation current started to be decreased. As a result of measurement of electroconductivity, the alignment film showed a conductivity on the order of $10^{-1}$ S/cm at the parts above the electrodes and a conductivity on the order of $10^{-7}$ S/cm at the parts other than electrodes in each case.

The alignment films were then rubbed under the same conditions as in Example 1. Then, five liquid crystal cells with different alignment film thickness were prepared by using the substrates with the alignment films.

Each liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby a tilt angle, a contrast (i.e., a ratio of transmittances between the bright state and the darkest state), and a delay time in optical response leading to after-image were measured. The results are shown in the following Table 4.

TABLE 4

| Film thickness | Tilt angle | Contrast | Delay time |
| --- | --- | --- | --- |
| 40 (Å) | 15 (deg.) | 52:1 | ≦0.1 sec |
| 80 | 15 | 52:1 | " |
| 120 | 15 | 52:1 | " |
| 160 | 15 | 52:1 | " |
| 200 | 15 | 52:1 | " |

At any thickness, the transmittance in the darkest state was 0.9% and the transmittance in the bright state was 47%. The delay in optical response causing after-image was at most 0.1 sec in any case and was thus satisfactory. Further, liquid crystal cells prepared in the same manner as above except the alignment films were subjected to the electrolytic oxidation after the rubbing, were evaluated in the same manner, whereby a sufficient alignment characteristic was attained homogeneously and similarly good results were obtained with respect to the contrast.

Each liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized even at a relatively high alignment film thickness. Referring to FIG. 12, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5–8 volts and ΔT=20–70 μsec.

EXAMPLE 8

Five liquid crystal cells were prepared in the same manner as in Example 7 except that alignment films were formed in a thickness of 200 Å by spin coating of a mixture solution of a polyimide precursor ("LQ1802" mfd. by Hitachi Kasei) and the polyaniline.

The liquid crystal cells having polyimide alignment films of different thickness showed similarly good results as in Example 7 as shown in the following Table 5.

TABLE 5

| Film thickness | Tilt angle | Contrast | Delay time |
|---|---|---|---|
| 40 (Å) | 15 (deg.) | 55:1 | ≦0.1 sec |
| 80 | 15 | 55:1 | " |
| 120 | 15 | 55:1 | " |
| 160 | 15 | 55:1 | " |
| 200 | 15 | 55:1 | " |

Further, as a result of multiplexing drive in the same manner as in Example 7, similarly good results as in Example 7 were obtained with respect to contrast and after-image.

EXAMPLE 9

Liquid crystal cells were prepared in the same manner as in Example 8 except that the following polypyrrole derivative was used instead of the polyaniline used in Example 8 and the electrolytic oxidation was performed by using a non-aqueous solution of $LiClO_4$ at 0.5M in acetonitrile as the electrolyte.

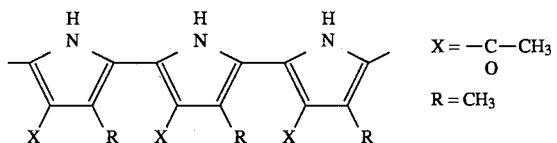

The liquid crystal cells showed similarly good results as in Example 8.

Further, as a result of multiplexing drive in the same manner as in Example 8, similarly good results as in Example 8 were obtained with respect to contrast and after-image.

EXAMPLE 10

A 200 Å-thick polyaniline alignment film was formed by spin coating of a solution in N-methylpyrrolidone as the solvent on electrode plates identical to those used in Example 7. As a result of electrolytic oxidation in the same manner as in Example 7, the alignment film showed a conductivity on the order of $10^0$ S/cm above the electrode and a conductivity on the order of $10^{-9}$ S/cm at the parts other than electrodes, a liquid crystal cell as prepared in the same manner as in Example 7 and evaluated in the same manner.

As a result, at any pixels, the transmittance in the darkest state was 0.8% and the transmittance in the bright state was 43%. The delay in optical response causing after-image was at most 0.1 sec and was thus satisfactory. Further, as a result of multiplexing drive in the same manner as in Example 7, similarly good results as in Example 7 were obtained with respect to contrast and after, image.

EXAMPLE 11

A liquid crystal cell was prepared in the same manner as in Example 10 except that alignment films were formed by spin coating of a soluble precursor of poly-2,5-thienylene vinylene to form a 200 Å-thick film, followed by baking under heating. As a result of evaluation of display characteristics, similarly good results as in Example 10 were obtained. Further, as a result of multiplexing drive in the same manner as in Example 7, similarly good results as in Example 7 were obtained with respect to contrast and after-image.

EXAMPLE 12

A biphenyl ester-based ferroelectric liquid crystal showing the following transition was used instead of the ferroelectric liquid crystal ("CS-1014") used in Examples 7–11.

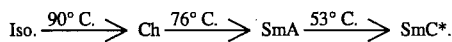

The liquid crystal showed a helical structure with a helical pitch of about 4 μm when formed in a large layer thickness (around 100 μm). The liquid crystal showed a spontaneous polarization of about 10 nC/cm as measured by the triangular wave method and a tilt angle θ of 23.5° C. (at a cell thickness of 1.5 μm) which is close to the optimum value.

The liquid crystal was injected into a blank cell identical to the one prepared in Example 1 (with an alignment film thickness of 200 Å) to form a liquid crystal cell. The liquid crystal cell showed an apparent tilt angle θ of 16 degrees which was smaller than the optimum value.

Then, the liquid crystal cell was supplied with an AC voltage of ±45–55 volts and a frequency of 40 Hz for 15 min., when a domain providing a tilt angle θ of 20.2 degrees began to appear. When the AC voltage was increased to the range of 55–70 volts, the domain of the increased tilt angle was enlarged to the entire cell, thus providing a very good contrast. On the contrary, at an AC voltage in excess of 70 volts, numerous defects occurred to collapse the monodomain structure. Switching between bistable states after appearance of the stable monodomain was effected according to the voltage-pulse width characteristic.

TABLE 6

| Pulse width (msec) | 1.5 | 1.0 | 0.5 |
|---|---|---|---|
| Voltage (V) | 16.2 | 17.0 | 21.0 |

The change in alignment state after the AC voltage application was considered to be caused by the release of a twist of a liquid crystal molecular layer as shown in FIG. 6(a). Further, the inversion voltage was increased from that before the AC voltage application. The reason for this has not been clarified as yet but it might be considered that a higher inversion voltage is required in order to invert liquid crystal molecules inclusive of those in the vicinity of the alignment films. The quantity of transmitted light in the bright state was remarkably increased, thus providing a remarkably increased contrast ratio, due to the increase in tilt angle θ after the AC voltage application. Further, the delay in optical response to an inversion electric field was at most 0.1 sec, and stable switching was possible.

A ferroelectric liquid crystal phase showing bistability is generally developed by cooling from a higher temperature. In this embodiment, when the cooling was effected under application of an AC electric field of 50 Hz and 65 volts, a homogeneous monodomain alignment state was realized over a wide range.

EXAMPLE 13

A blank cell was prepared by using a pair of electrode plates having 200 Å-thick alignment films of LQ1801 polyimide/polyaniline prepared in the same manner as in Example 8 and by affixing the pair of electrode plates so that their rubbing directions were anti-parallel to each other. A liquid crystal cell was prepared by filling the blank cell with the same ferroelectric liquid crystal as in Example 5 and supplied with an AC voltage of 40 Hz and 60 V for 15 min., whereby a homogenous monodomain alignment state providing a tilt angle θ of 21.8 degrees was developed. The liquid crystal cells were evaluated in the same manner as in Example 7 and found to provide a contrast ratio which was remarkably improved compared with that in Example 8.

Further, as a result of multiplexing drive in the same manner as in Example 7, similarly good results as in Example 7 were obtained with respect to contrast and after-image.

Figure 14:
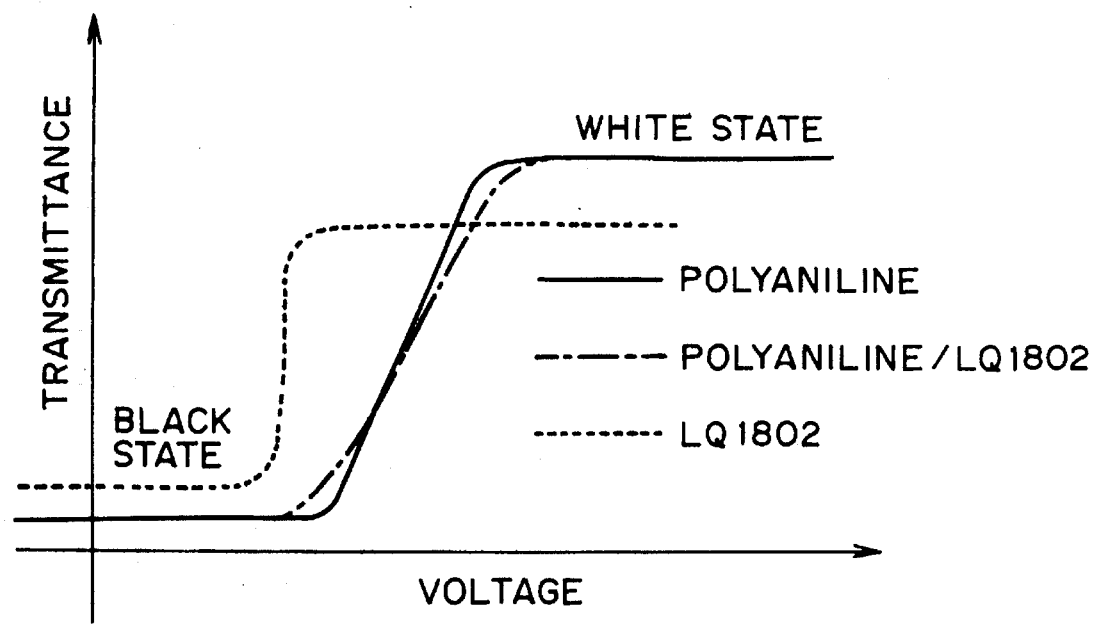

Then, the liquid crystal cell was supplied with rectangular pulses with a pulse width of 50 μsec and varying amplitudes whereby a voltage (V) transmittance (T) characteristic as represented by a dot-and-dash line in FIG. 14 was obtained. The V-T characteristic was more moderate than the V-T characteristic of a comparative liquid crystal cell with 8-layer LB films of LQ 1802 polyimide alone represented by a dot line in FIG. 14. The moderate V-T characteristic (causing a gradual change in transmittance in response to a voltage change) may be attributable to the distribution of minute regions having different threshold voltages over a pixel. Such moderate V-T characteristics attained by forming an alignment film with a mixture of an electroconductive polymeric compound and a polyimide alignment material was found to provide a halftone display characteristic. The two liquid crystal cells of this example was also found to provide a larger contrast compared with the comparative liquid crystal cell as shown in FIG. 14.

In this example, a liquid crystal cell was also prepared in the same manner as above except that the alignment films were formed by changing the mixing ratio of the polyimide/polyaniline mixture. The liquid crystal cell also showed a good V-T characteristic which was however somewhat different from that in the above example represented by the dot-and-dash line. The difference in V-T characteristic between the two liquid crystal cells having different mixing ratios was found but the mechanism thereof has not been clarified as yet.

EXAMPLE 14

Blank cells were prepared by using three pairs of electrode plates having electroconductive polymer alignment films prepared in the same manner as in Examples 9, 10 and 11, respectively, and by affixing each pair of electrode plates so that their rubbing directions were anti-parallel to each other. Three liquid crystal cells were prepared by filling the blank cells with the same ferroelectric liquid crystal as in Example 12 and supplied with an AC voltage of 40 Hz and 60 V for 15 min., whereby homogenous monodomain alignment states providing a tilt angles θ of 21.4 degrees, 21.5 degrees and 21.4 degrees, respectively, were developed. The liquid crystal cells were evaluated in the same manner as in Example 7 and found to provide contrast ratios which were remarkably improved compared with those in Examples 3–5.

Further, as a result of multiplexing drive in the same manner as in Example 7, similarly good results as in Example 7 were obtained with respect to contrast and after-image.

Then, the liquid crystal cells were supplied with rectangular pulses with a pulse width of 50 μsec and varying amplitudes whereby good voltage (V) transmittance (T) characteristics similarly as in Example 13 were obtained, including one representatively shown by a solid line in FIG. 14 obtained by the liquid crystal cell comprising polyaniline alignment film as in Example 10. As is shown, the V-T characteristics were moderate and found to be suitable for halftone display.

As described hereinabove, according to the present invention, the following advantageous effects can be accomplished.

(1) By imparting a high electroconductivity selectively to parts of an alignment film forming pixels alone, it becomes possible to use a relatively thick alignment film having a good alignment performance, so that a ferroelectric liquid crystal having a large spontaneous polarization can be effectively aligned and driven without causing crosstalk between pixels.

(2) It is possible to provide a large tilt angle particularly in a non-helical structure of a ferroelectric liquid crystal, thus providing a high contrast between the dark and bright states, particularly a high quality display with a very high display contrast during multiplexing drive without being accompanied with an ugly after-image phenomenon.

(3) While a liquid crystal device using a ferroelectric liquid crystal having a large spontaneous polarization has been considered to provide an inferior drive characteristic because of a reverse electric field effect, a liquid crystal device of the present invention provides a good drive characteristic free from the reverse electric field effect even when such a ferroelectric liquid crystal is used.

(4) It is possible to provide a pixel having a distribution of minute regions showing different threshold voltages, thus providing a moderate V-T characteristic advantageous for halftone display.

What is claimed is:

1. A liquid crystal device, comprising a pair of substrates each having an electrode thereon and a liquid crystal disposed between the substrates, wherein at least one of the substrates is provided with an electroconductive protective film and also an alignment film comprising an alignment material and a polymeric electroconductive compound.

2. A liquid crystal device according to claim 1, wherein said protective film has a conductivity of at least $10^{-10}$ S/cm.

3. A liquid crystal device according to claim 1, wherein said protective film has a conductivity of $10^{-8}$ to $10^{-4}$ S/cm.

4. A liquid crystal device according to claim 1, wherein said protective film comprises a metal oxide or a metal sulfide.

5. A liquid crystal device according to claim 1, wherein said protective film has a thickness of 200–1000 Å.

6. A liquid crystal device according to any of claims 1–5, wherein said polymeric electroconductive compound is at least one member selected from the group consisting of polypropylle, polyaniline and derivatives thereof represented by the following formula (1) and (2), and polythiophene and derivatives thereof:

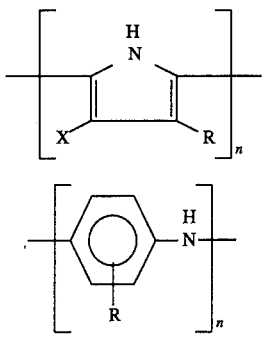

wherein X=—CO R, R=$C_mH_{2m+1}$, and m is an integer of 0–12.

7. A liquid crystal device according to any of claims 1–5, wherein said alignment material is at least one member selected from the group consisting of polyimides, polyamideimides and derivatives thereof.

8. A liquid crystal device according to any of claims 1–5, wherein said alignment film has a thickness of at most 500 Å.

9. A liquid crystal device according to any of claims 1–5, wherein said alignment film has been formed by Lauginuir-Blodgett technique.

10. A liquid crystal device according to any of claims 1–5, wherein said alignment film has been rubbed for controlling initial alignment of liquid crystal molecules.

11. A liquid crystal device according to any of claims 1–5, wherein said liquid crystal has a spontaneous polarization of at least 10 nC/cm$^2$.

12. A liquid crystal device according to any of claims 1–5, wherein said liquid crystal is a ferroelectric liquid crystal showing a helical pitch of at most 0.5 μm in SmC* phase.

13. A liquid crystal device according to any of claims 1–5, wherein said liquid crystal has been supplied with an AC electric field for improved initial alignment state.

14. A liquid crystal device, comprising:
a pair of mutually opposed substrates each having an electrode locally-disposed thereon so as to form a pixel at a portion where the electrodes intersect with each other, said liquid crystal device further comprising a liquid crystal disposed between the substrates, wherein at least one of the substrates is provided with an alignment film having locally enhanced electroconductivity at the portion thereof on the electrode.

15. A liquid crystal device according to claim 14, wherein the alignment film has a resistivity of at least 10$^5$ Ω·cm between pixels.

16. A liquid crystal device according to claim 14 or 17, wherein the portion of the alignment film on the electrodes has an electroconductivity of at least 10$^{-4}$ S/cm.

* * * * *

UNITED STATES PATENT AND TRADEMARK OFFICE
CERTIFICATE OF CORRECTION

PATENT NO. : 5,465,169
DATED : November 7, 1995
INVENTOR(S) : KEN EGUCHI

It is certified that error appears in the above-identified patent and that said Letters Patent is hereby corrected as shown below:

COLUMN 2

Line 40, "according" should read --accordingly--.

COLUMN 4

Line 6, "polypropylle" should read --polypropyrrole--.

COLUMN 7

Line 4, "14" should read --14a--.
    Line 11, "pylle," should read --pyrrole--.
    Line 44, "With" should read --with--.
    Line 46, "Selectively" should read --selectively--.

COLUMN 8

Line 66, "Of" should read --of--.

COLUMN 9

Line 1, "Of" should read --of--.

COLUMN 12

Line 5, "mixture." should read --mixture was prepared.--.
    Line 6, "strated" should read --strate--.

UNITED STATES PATENT AND TRADEMARK OFFICE
CERTIFICATE OF CORRECTION

PATENT NO. : 5,465,169
DATED : November 7, 1995
INVENTOR(S) : KEN EGUCHI

Page 2 of 3

It is certified that error appears in the above-identified patent and that said Letters Patent is hereby corrected as shown below:

COLUMN 13

Line 17, "afterimage" should read --after-image--.
Line 20, "dateline" should read --data line--.
Line 67, "Example i" should read --Example 1--.

COLUMN 16

Line 64, "date" should read --data--.

COLUMN 20

Line 62, "200- 1000 Å." should read --200-1000 Å.--.
Line 66, "polypoylle," should read --polypyrrole--.

COLUMN 21

Line 27, "Lauginuir-" should read -Laugmuir- --.

UNITED STATES PATENT AND TRADEMARK OFFICE
CERTIFICATE OF CORRECTION

PATENT NO. : 5,465,169
DATED : November 7, 1995
INVENTOR(S) : KEN EGUCHI

It is certified that error appears in the above-identified patent and that said Letters Patent is hereby corrected as shown below:

<u>COLUMN 22</u>

Line 14, "locally-disposed" should read
         --locally disposed--.
    Line 26, "17," should read --15,--.

Signed and Sealed this

Thirtieth Day of April, 1996

Attest:

BRUCE LEHMAN

*Attesting Officer*     *Commissioner of Patents and Trademarks*